(12) United States Patent
Chen et al.

(10) Patent No.: US 9,025,278 B1
(45) Date of Patent: May 5, 2015

(54) TOOL-LESS HARD DISK CARRIER

(71) Applicant: Quanta Computer Inc., Taoyuan Shien (TW)

(72) Inventors: Chao-Jung Chen, New Taipei (TW); Yaw-Tzorng Tsorng, Taipei (TW); Mao-Chao Yang, Taoyuan County (TW); Yung-Shiang Lin, New Taipei (TW)

(73) Assignee: Quanta Computer Inc., Taoyuan Shien (TW)

( * ) Notice: Subject to any disclaimer, the term of this patent is extended or adjusted under 35 U.S.C. 154(b) by 0 days.

(21) Appl. No.: 14/583,472

(22) Filed: Dec. 26, 2014

(30) Foreign Application Priority Data

Jun. 24, 2014 (TW) .............................. 103121730 A

(51) Int. Cl.
*G11B 5/39* (2006.01)
(52) U.S. Cl.
CPC ....................................... *G11B 5/39* (2013.01)

(58) Field of Classification Search
USPC ....................................................... 360/99.15
See application file for complete search history.

(56) References Cited

U.S. PATENT DOCUMENTS

| | | | |
|---|---|---|---|
| 7,944,691 B1 * | 5/2011 | Pounds .................... | 361/679.59 |
| 2012/0134092 A1 * | 5/2012 | Terwilliger et al. ...... | 361/679.33 |
| 2014/0016262 A1 * | 1/2014 | Lo ............................ | 361/679.33 |
| 2014/0078664 A1 * | 3/2014 | Lau et al. ................. | 361/679.33 |

* cited by examiner

*Primary Examiner* — Mark Blouin
(74) *Attorney, Agent, or Firm* — Rabin & Berdo, P.C.

(57) ABSTRACT

The tool-less hard disk carrier is provided and configured to accommodate a hard disk. The hard disk has a first screw hole and a second screw hole respectively located at two sides of the hard disk. The tool-less hard disk carrier includes a housing, a moving part, a first pin, and a second pin. The housing includes a first sidewall and a bottom board connected to each other. The moving part has a sliding portion and an abutting portion connected to each other. The sliding portion is slidably engaged with the bottom board. The abutting portion is bent relative to the sliding portion to face the first sidewall. The abutting portion and the housing define an accommodating space, and the accommodating space is configured to accommodate the hard disk.

10 Claims, 8 Drawing Sheets

TOOL-LESS HARD DISK CARRIER

RELATED APPLICATIONS

This application claims priority to Taiwan Application Serial Number 103121730, filed Jun. 24, 2014, which is herein incorporated by reference.

BACKGROUND

1. Technical Field

The present disclosure relates to a tool-less hard disk carrier. More particularly, the present disclosure relates to a tool-less hard disk carrier without screws.

2. Description of Related Art

When a hard disk is placed into a conventional hard disk container, screws are required to fix the hard disk. If the hard disk is not fixed by the screws, the vibration generated by the hard disk during operation may cause the data of the hard disk to be lost. Therefore, the screws are necessary for stabilizing the hard disk.

However, in a server architecture, there are many hard disks. When the hard disks need to be repaired, it is time consuming to disassemble screws. Therefore, the skill of enabling maintenance personnel to accelerate the replacement of hard disks and meanwhile to maintain the stability of hard disks during operation becomes a topic of study.

SUMMARY

The disclosure provides a tool-less hard disk carrier configured to accommodate a hard disk. The hard disk has a first screw hole and a second screw hole respectively located at two sides of the hard disk. The tool-less hard disk carrier includes a housing, a moving part, a first pin, and a second pin. The housing includes a first sidewall and a bottom board connected to each other. The moving part has a sliding portion and an abutting portion connected to each other. The sliding portion is slidably engaged with the bottom board. The abutting portion is bent relative to the sliding portion to face the first sidewall. The abutting portion and the housing define an accommodating space, and the accommodating space is configured to accommodate the hard disk. The first pin is located in the accommodating space and is connected to the first sidewall. The first pin is configured to be inserted into the first screw hole. The second pin is located in the accommodating space and is connected to the abutting portion. The second pin is configured to be inserted into the second screw hole. When the moving part moves toward the first sidewall to clamp the hard disk between the first sidewall and the abutting portion, the first pin and the second pin are respectively inserted into the first screw hole and the second screw hole. When the moving part moves away from the first sidewall, the second pin is drawn out of the second screw hole, and the abutting portion moves away from the hard disk.

In an embodiment of the present disclosure, the tool-less hard disk carrier includes a latching mechanism pivotally connected to the bottom board and located outside the accommodating space. The latching mechanism selectively locks or releases the moving part.

In an embodiment of the present disclosure, the latching mechanism includes a first hook portion and a pivot axis pivotally connected to each other. The pivot axis is fixed to the bottom board. The moving part includes a second hook portion. The second hook portion is connected to the sliding portion. The first hook portion is rotated parallel to the bottom board by the pivot axis so as to selectively lock or release the second hook portion.

In an embodiment of the present disclosure, the tool-less hard disk carrier includes a spring located at the bottom board. The spring is connected to the latching mechanism. The spring supplies a torque to make the first hook portion continuously engaged with the second hook portion.

In an embodiment of the present disclosure, the tool-less hard disk carrier includes two elastic sheets connected to the first sidewall and the abutting portion respectively. Each of the elastic sheets includes a convex bump located outside the accommodating space. The convex bump is configured to abut an inner wall of the hard disk rack when the tool-less hard disk carrier is accommodated in a hard disk rack.

In an embodiment of the present disclosure, the tool-less hard disk carrier includes a first stopping element. The first stopping element is connected to the bottom board and located outside the accommodating space. The sliding portion has a sliding groove slidably engaged with the first stopping element.

In an embodiment of the present disclosure, the tool-less hard disk carrier includes two second stopping elements. The second stopping elements are connected to the bottom board and located outside the accommodating space. The second stopping elements are located at two sides of the sliding portion respectively. Each of the second stopping elements includes a side portion and a top portion. The side portions are connected to the bottom board. The sliding portion slidably abuts between the side portions. Each of the top portions is connected to the corresponding side portion. Each of the top portions is bent relative to the corresponding side portion. The sliding portion slidably abuts between the bottom board and the top portions. Each of the side portions is perpendicular to the first sidewall so as to enable the sliding portion to perpendicularly move toward or away from the first sidewall.

In an embodiment of the present disclosure, the tool-less hard disk carrier includes a second sidewall and a third sidewall. The second sidewall is connected to the bottom board and an end of the first sidewall. The third sidewall is connected to the bottom board and another end of the first sidewall. The hard disk slidably abuts between the second sidewall and the third sidewall.

In an embodiment of the present disclosure, the first pin includes a first cylinder portion and a first hexagon head portion connected to each other. The first hexagon head portion is connected to the first sidewall. The second pin includes a second cylinder portion and a second hexagon head portion connected to each other. The second hexagon head portion is connected to the abutting portion.

In an embodiment of the present disclosure, the latching mechanism includes an operation portion connected to the first hook portion. The operation portion and the first hook portion extend away from the pivot axis.

Accordingly, in the present disclosure, the operator can place or draw the hard disk in or out of the tool-less hard disk carrier without using any tool or screw, thereby installing the hard disk stably and rapidly. The element of the housing is designed to reduce the thickness to save space.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
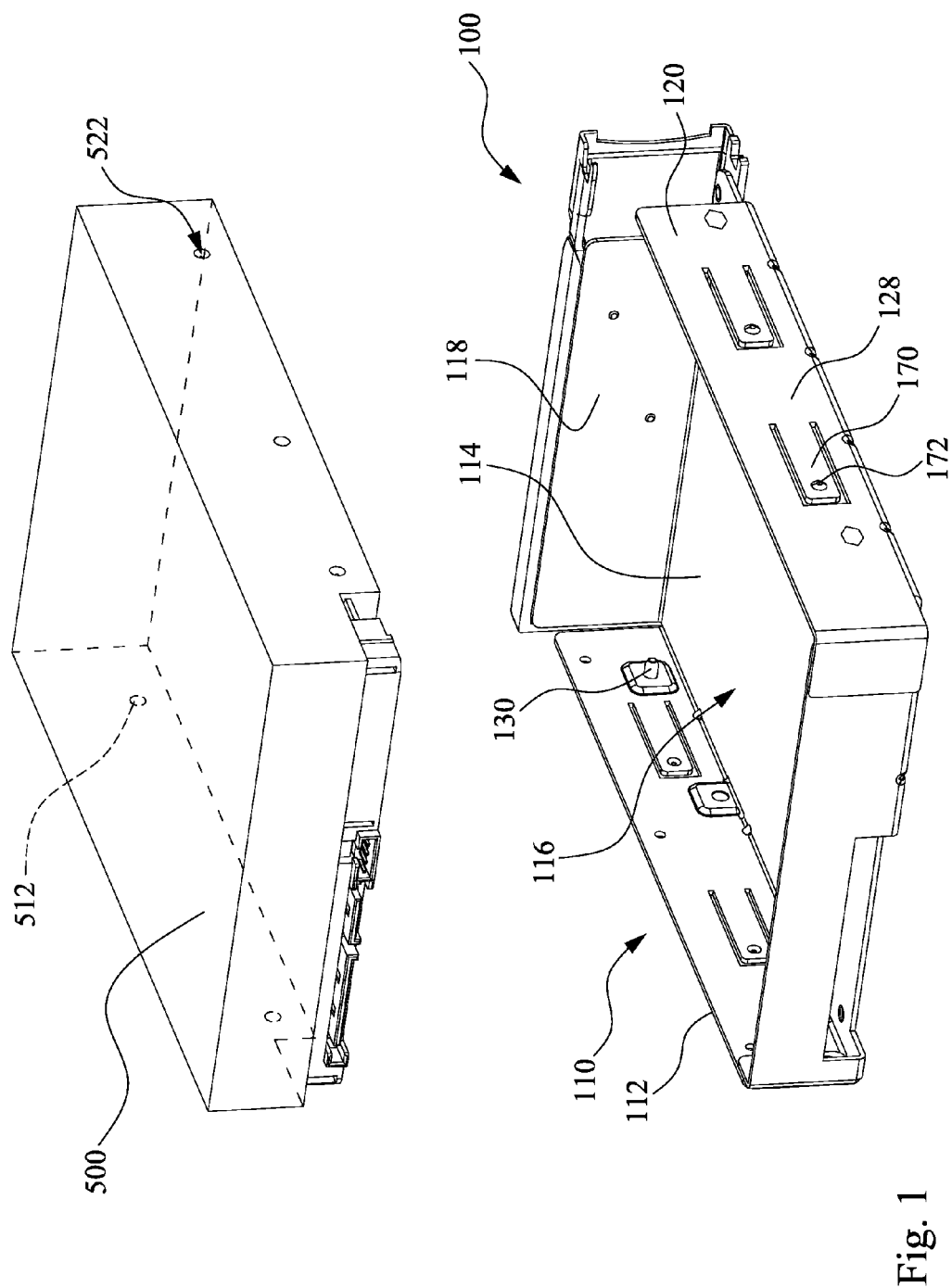
FIG. 1 is a schematic view of a tool-less hard disk carrier and a hard disk according to an embodiment of the present disclosure.

The present disclosure can be more fully understood by reading the following detailed description of the embodiment, with reference made to the accompanying drawings. Wherever possible, the same reference numbers are used in the drawings and the description to refer to the same or like parts. However, the embodiments are not provided to limit the scope covered in the present disclosure, and the description of the operation of the structures is not intended to limit the order in which to perform, any structure formed by re-combination of the elements that result in a device with equal effect are all covered in the scope of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
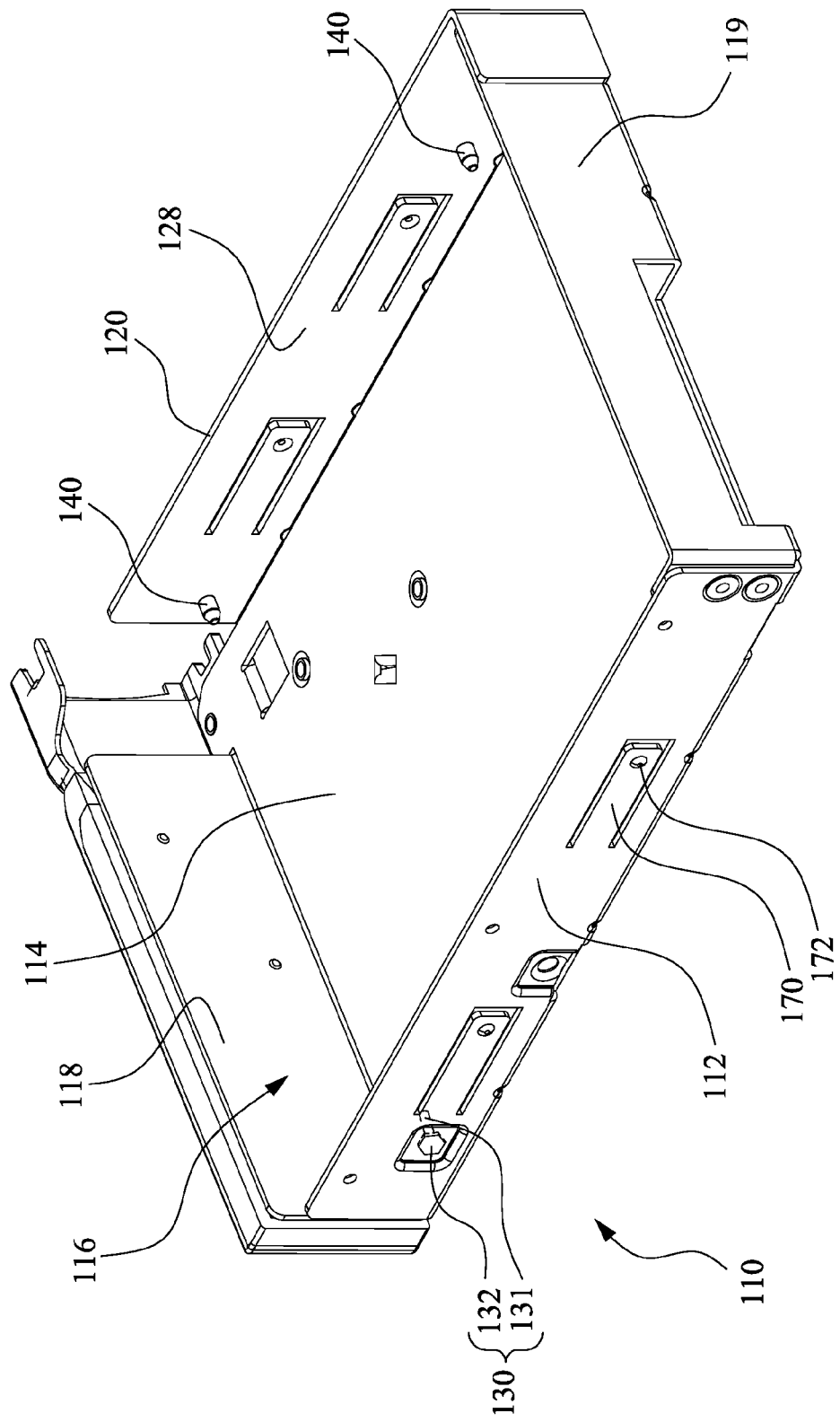
FIG. 2 is a perspective view of the tool-less hard disk carrier in FIG. 1.
Figure 3:
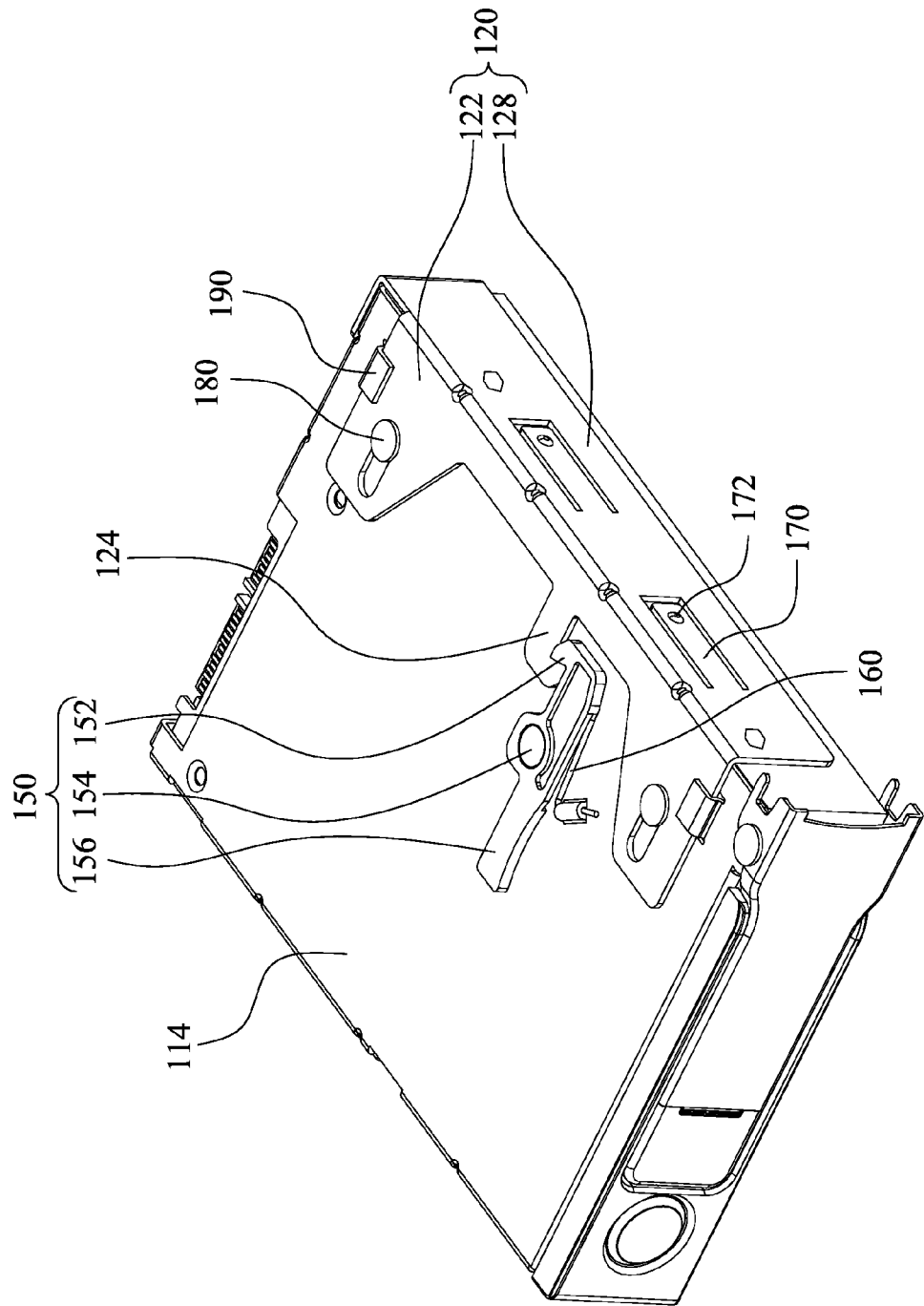
FIG. 3 is a bottom perspective view of the tool-less hard disk carrier of FIG. 2 in a locking status.

FIG. 1 is a schematic view of a tool-less hard disk carrier 100 and a hard disk 500 according to an embodiment of the present disclosure. FIG. 2 is a perspective view of the tool-less hard disk carrier in FIG. 1. FIG. 3 is a bottom perspective view of the tool-less hard disk carrier in FIG. 2 in a locking status.

As shown in FIG. 1, FIG. 2, and FIG. 3, the tool-less hard disk carrier 100 is configured to accommodate a hard disk 500. The hard disk 500 has a first screw hole 512 and a second screw hole 522 respectively located at two sides of the hard disk 500. The tool-less hard disk carrier 100 includes a housing 110, a moving part 120, a first pin 130, and a second pin 140. The housing 110 includes a first sidewall 112 and a bottom board 114 connected to each other. The moving part 120 has a sliding portion 122 and an abutting portion 128 connected to each other. The sliding portion 122 is slidably engaged with the bottom board 114. The abutting portion 128 is bent relative to the sliding portion 122 to face the first sidewall 112. The abutting portion 128 and the housing 110 define an accommodating space 116, and the accommodating space 116 is configured to accommodate the hard disk 500. The first pin 130 is located in the accommodating space 116 and is connected to the first sidewall 112. The first pin 130 is configured to be inserted into the first screw hole 512. The second pin 140 is located in the accommodating space 116 and is connected to the abutting portion 128. The second pin 140 is configured to be inserted into the second screw hole 522.

The first pin 130 and the second pin 140 are made of metal. Metal is better than plastic or rubber for securing the hard disk 500 to decrease the vibration of the hard disk 500 in operation. In this embodiment, the quantity of the first pin 130 is one, and the quantity of the second pins 140 is two. Such quantity arrangement may satisfy the requirements of rapid installation and vibration resistance.

People having ordinary skill in the art can make proper modification to the materials and quantities of the first pin 130 and the second pin 140 according to their actual needs.

Figure 4:
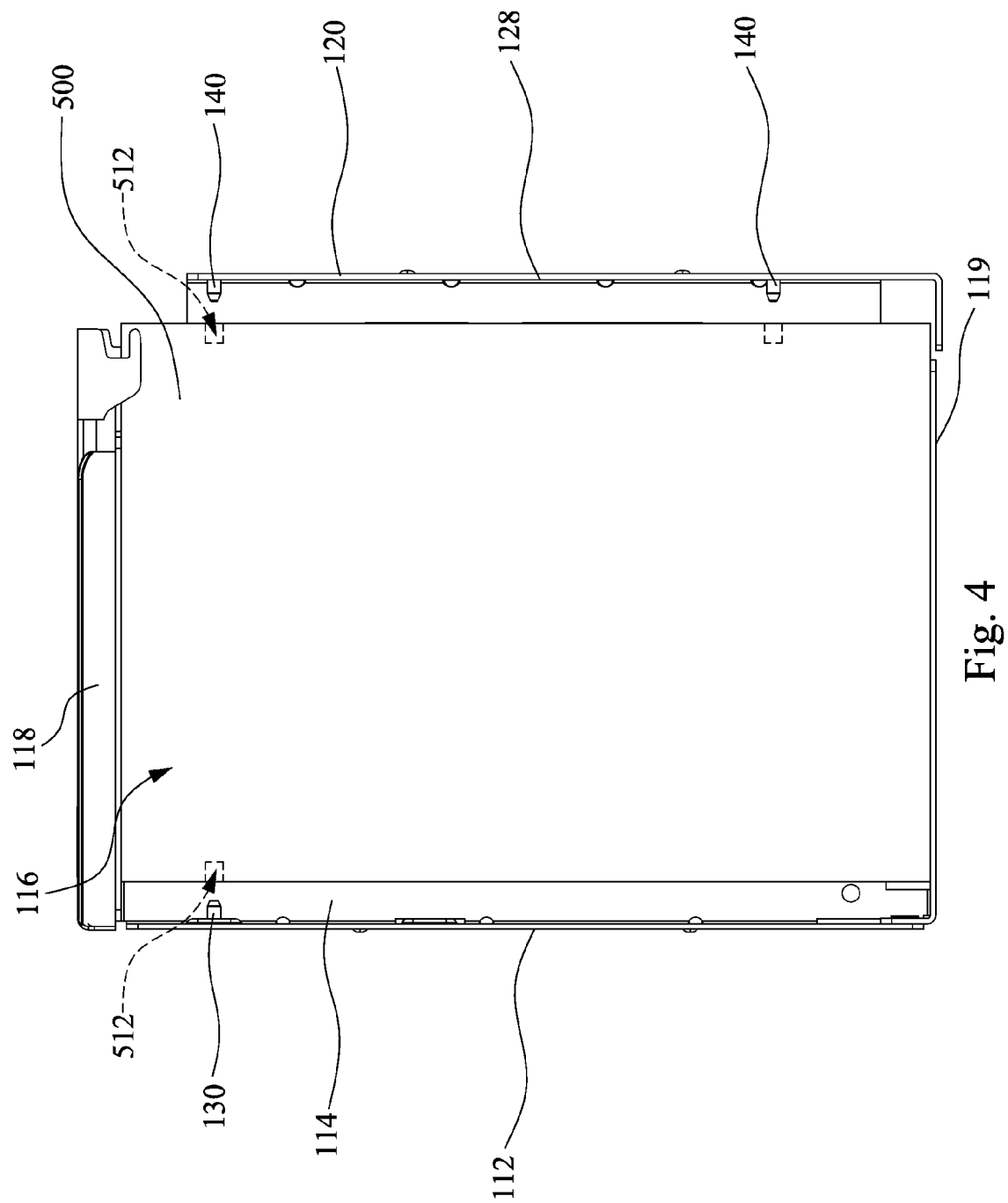
FIG. 4 is a top view showing the tool-less hard disk carrier in a releasing status according to an embodiment of the present disclosure.
Figure 5:
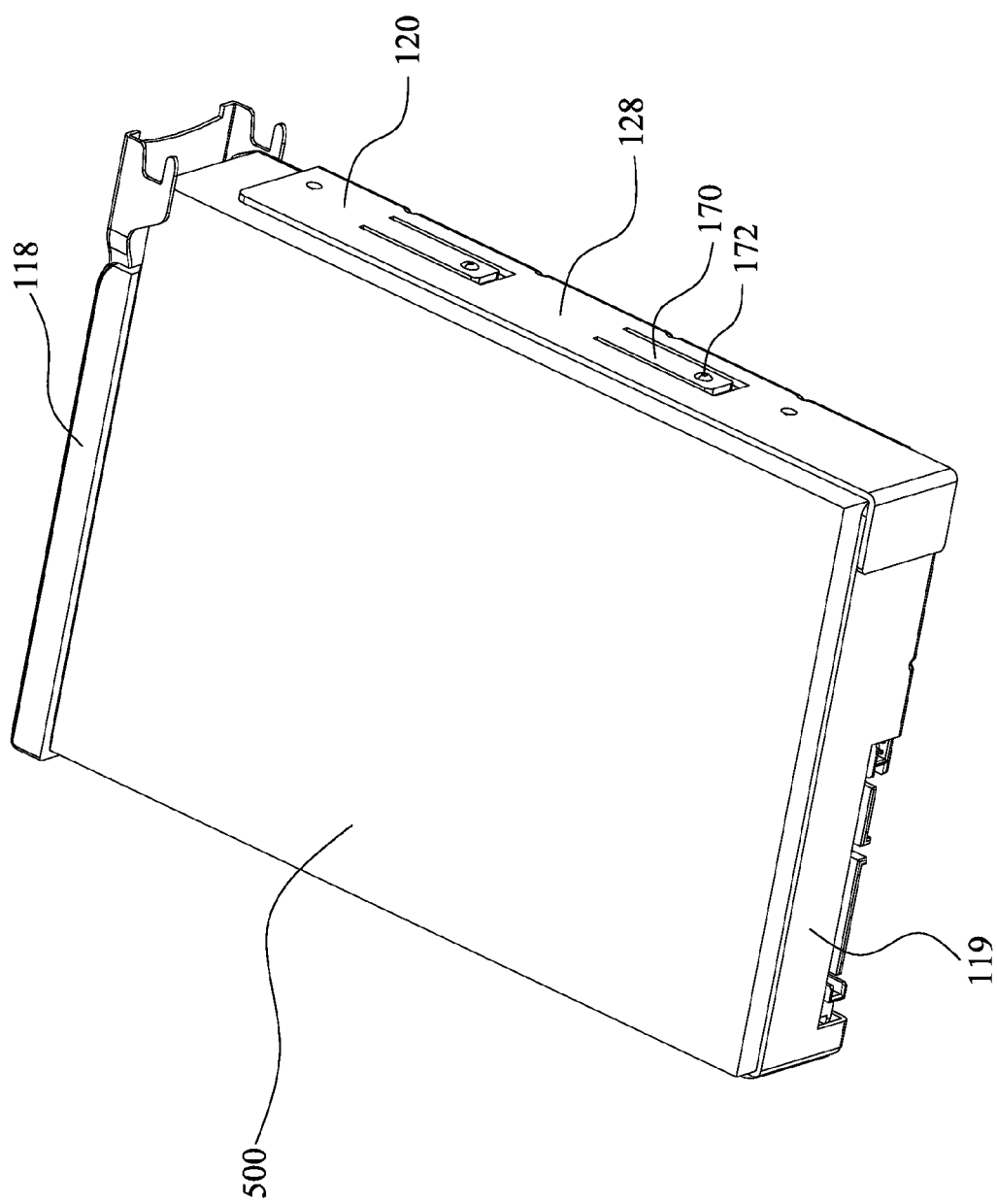
FIG. 5 is a top perspective view of the tool-less hard disk carrier of FIG. 4 in the locking status.

FIG. 4 is a top view showing that the tool-less hard disk carrier 100 in a releasing status according to an embodiment of the present disclosure. FIG. 5 is a top perspective view of the tool-less hard disk carrier 100 of FIG. 4 in the locking engaging status.

As shown in FIG. 4 and FIG. 5, the tool-less hard disk carrier 100 includes a second sidewall 118 and a third sidewall 119. The second sidewall 118 is connected to the bottom board 114 and an end of the first sidewall 112. The third sidewall 119 is connected to the bottom board 114 and another end of the first sidewall 112. The hard disk 500 slidably abuts between the second sidewall 118 and the third sidewall 119. After an operator placing the hard disk 500 into the accommodating space 116, the hard disk 500 abuts between the second sidewall 118 and the third sidewall 119. At this time, the first pin 130 and the second pin 140 are respectively aligned with the first screw hole 512 and the second screw hole 522 for the operator's convenience. When the moving part 120 moves toward the first sidewall 112 to clamp the hard disk 500 between the first sidewall 112 and the abutting portion 128, the first pin 130 and the second pin 140 are respectively inserted into the first screw hole 512 and the second screw hole 522. After that, the operator pushes the moving part 120 toward the first sidewall 112 until the moving part 120 stops moving, and the procedure of positioning the hard disk 500 is completed (as shown in FIG. 5). When desiring to draw out the hard disk 500, the operator merely needs to push the moving part 120 away from the first sidewall 112. When the moving part 120 moves away from the first sidewall 112, the second pin 140 is drawn out of the second screw hole 522, and the abutting portion 128 moves away from the hard disk 500. Then, the operator can draw out the hard disk 500. In the present disclosure, the operator can place in or draw out the hard disk 500 without any tool or screw, thereby installing the hard disk 500 stably and rapidly. Meanwhile, the housing 110 completely adopts a thinning design to save space.

Figure 6:
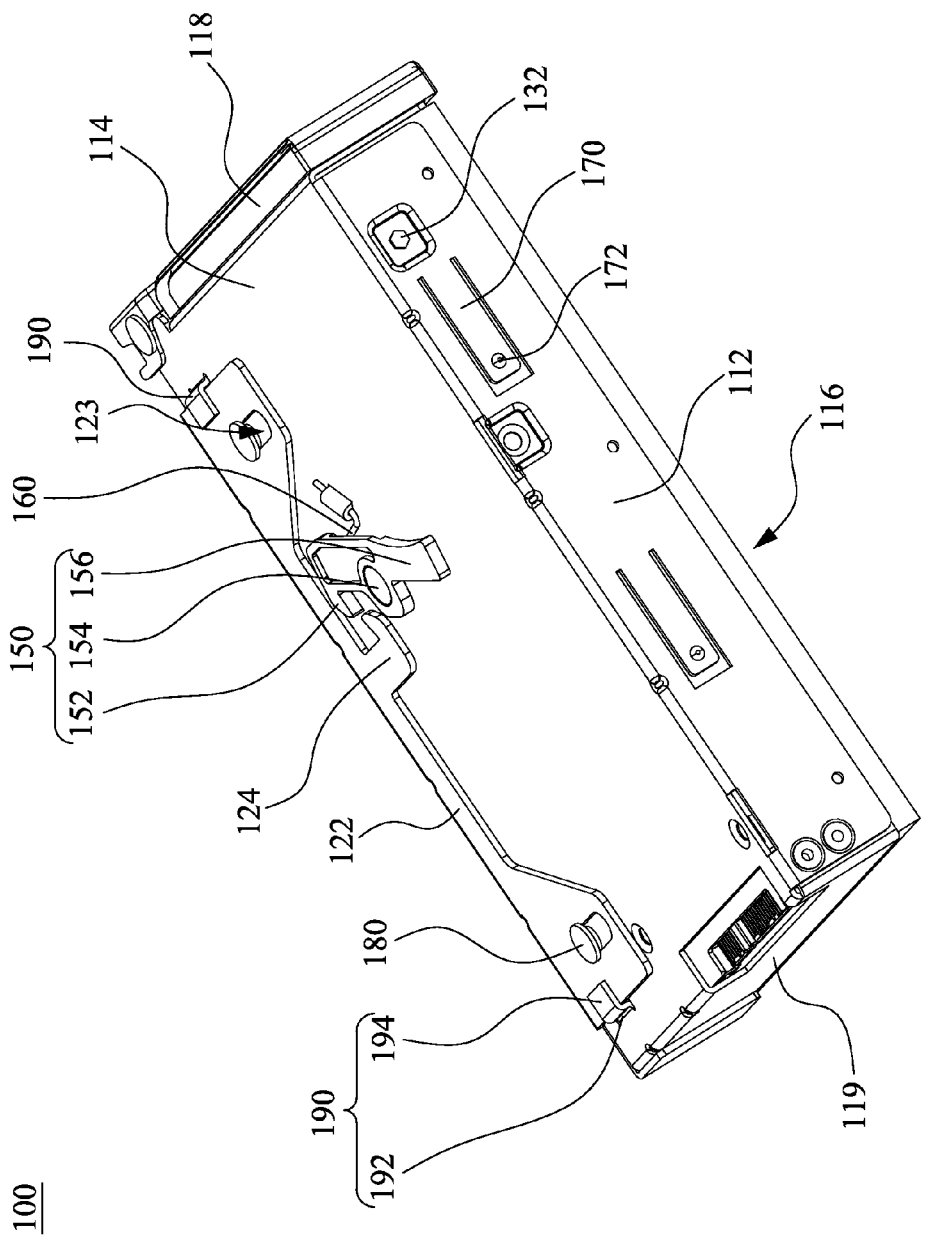
FIG. 6 is a bottom perspective view of the tool-less hard disk carrier in the releasing status according to an embodiment of the present disclosure.

FIG. 6 is a bottom perspective view of the tool-less hard disk carrier 100 in the releasing status according to an embodiment of the present disclosure.

As shown in FIG. 3 and FIG. 6, the tool-less hard disk carrier 100 includes a latching mechanism 150 pivotally connected to the bottom board 114 and located outside the accommodating space 116. The latching mechanism 150 selectively locks or releases the moving part 120. The latching mechanism 150 includes a first hook portion 152 and a pivot axis 154 pivotally connected to each other. The pivot axis 154 is fixed to the bottom board 114. The moving part 120 includes a second hook portion 124. The second hook portion 124 is connected to the sliding portion 122. The first hook portion 152 is rotated parallel to the bottom board 114 by the pivot axis 154 so as to selectively lock or release the second hook portion 124. The latching mechanism 150 and the second hook portion 124 adopts a thinning design to save space.

The tool-less hard disk carrier 100 includes a spring 160 located at the bottom board 114. The spring 160 is connected to the latching mechanism 150. The spring 160 provides a torque to make the first hook portion 152 continuously engaged with the second hook portion 124. Therefore, when the tool-less hard disk carrier 100 is transported, the first hook portion 152 does not escape from the second hook portion 124. That is, the transportation of the tool-less hard disk carrier 100 and the hard disk 500 is safer. The latching mechanism 150 includes an operation portion 156 connected to the first hook portion 152. The operation portion 156 and the first hook portion 152 extend away from the pivot axis 154. When the operator draws out the hard disk 500, the operator pushes the operation portion 156 to release the first hook portion 152 from the second hook portion 124. After that, the operator pushes the moving part 120 to draw the second pin 140 out of the hard disk 500 for extracting the hard disk 500. In an embodiment of the present disclosure, the spring 160 pushes the first hook portion 152 to provide a torque. In another embodiment of the present disclosure, the spring 160 pulls the operation portion 156 to provide torque.

The tool-less hard disk carrier 100 includes a first stopping element 180. The first stopping element 180 is connected to the bottom board 114 and located outside the accommodating space 116. The sliding portion 122 has a sliding groove 123 slidably engaged with the first stopping element 180. The tool-less hard disk carrier 100 includes two second stopping elements 190. The second stopping elements 190 are connected to the bottom board 114 and located outside the accommodating space 116. The second stopping elements 190 are located at two sides of the sliding portion 122 respectively. Each of the second stopping elements 190 includes a side portion 192 and a top portion 194. The side portions 192 are connected to the bottom board 114. The sliding portion 122 slidably abuts between the side portions 192. Each of the top portions 194 is connected to the corresponding side portion 192. Each of the top portions 194 is bent relative to the corresponding side portion 192. The sliding portion 122 slidably abuts between the bottom board 114 and the top portions 194. Each of the side portions 192 is perpendicular to the first sidewall 112 so as to enable the sliding portion 122 to perpendicularly move toward or away from the first sidewall 112. By using the sliding engagement of the first stopping element 180 and the sliding groove 123, and the position-limiting function of the second stopping element 190, the sliding portion 122 can slide more stably. Furthermore, because the side portion 192 restricts the sliding portion 122 to move toward or away from the first sidewall 112 perpendicularly, the second pin 140 can be inserted into the second screw hole 522 perpendicularly. Due to the requirement of vibration resistance, the second pin 140 needs to fit the second screw hole 522 to reduce vibration. Accordingly, the second pin 140 is inserted into the second screw hole 522 perpendicularly, and the diameter of the second screw hole 522 can be designed to fit the second pin 140, thus increasing the stability of the hard disk 500.

Figure 7:
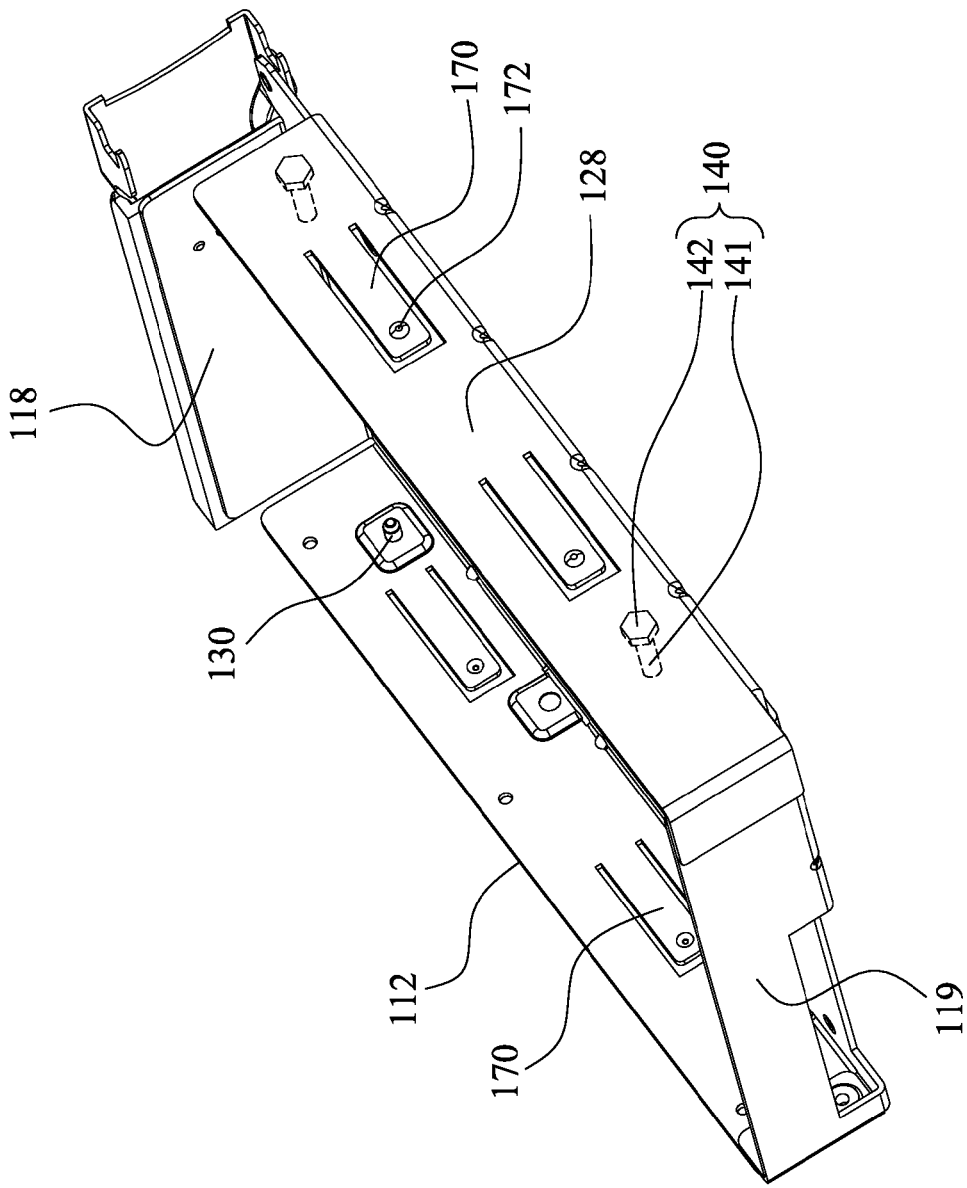
FIG. 7 is a side perspective view of the tool-less hard disk carrier according to an embodiment of the present disclosure.

FIG. 7 is a side perspective view of the tool-less hard disk carrier 100 according to an embodiment of the present disclosure.

As shown in FIG. 2 and FIG. 7, the first pin 130 includes a first cylinder portion 131 and a first hexagon head portion 132 connected to each other. The first hexagon head portion 132 is connected to the first sidewall 112. The second pin 140 includes a second cylinder portion 141 and a second hexagon head portion 142 connected to each other. The second hexagon head portion 142 is connected to the abutting portion 128. The first hexagon head portion 132 and the second hexagon head portion 142 are hexagonal. A hexagonal shape is more stable than a circle shape, thus decreasing vibration.

Figure 8:
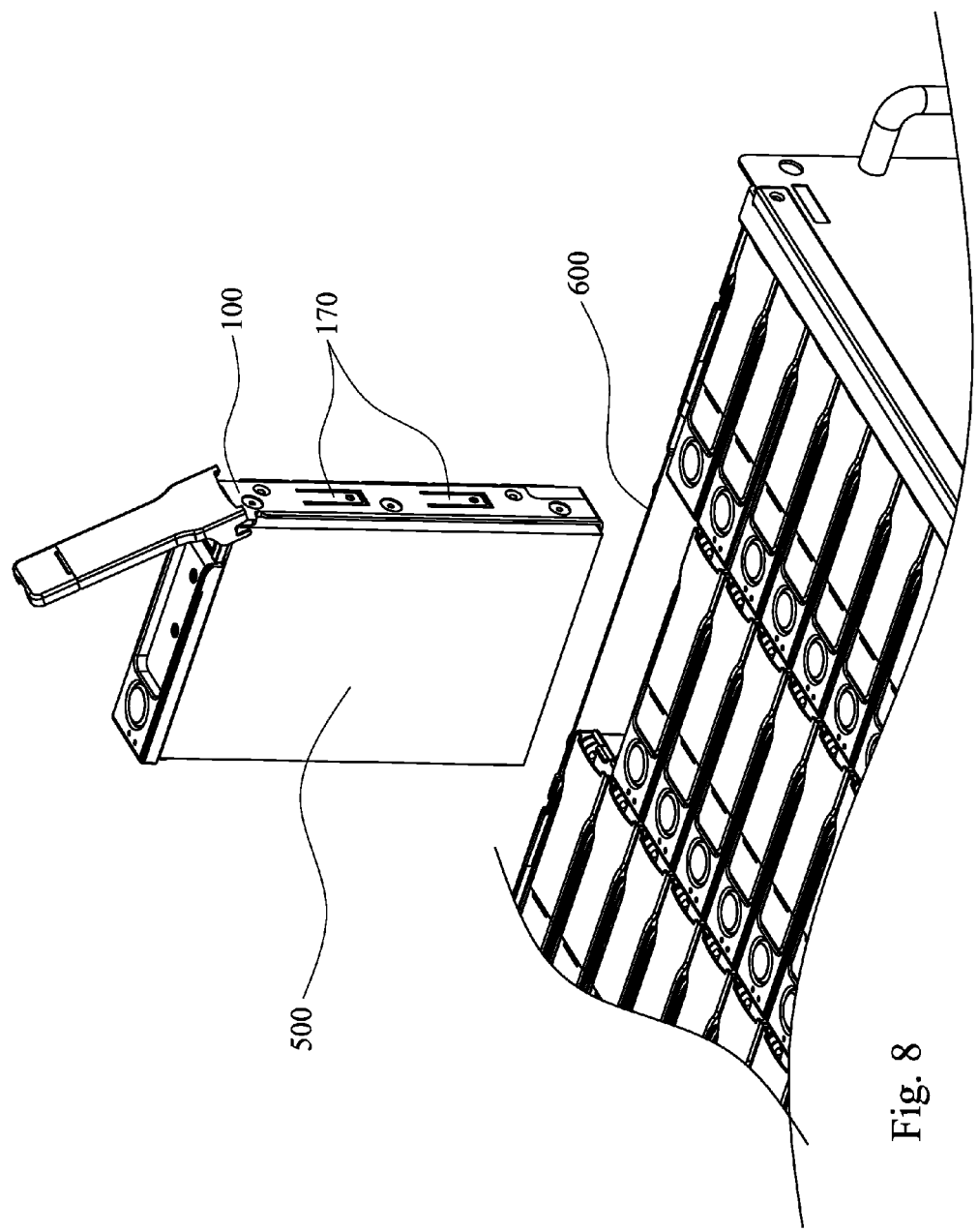
FIG. 8 is a schematic view showing that the tool-less hard disk carrier is placed into a hard disk rack according to an embodiment of the present disclosure.

FIG. 8 is a schematic view showing that the tool-less hard disk carrier 100 is placed into a hard disk rack 600 according to an embodiment of the present disclosure.

As shown in FIG. 7 and FIG. 8, the tool-less hard disk carrier 100 includes two elastic sheets 170 connected to the first sidewall 112 and the abutting portion 128 respectively. Each of the elastic sheets 170 includes a convex bump 172 located outside the accommodating space 116. The convex bump 172 is configured to abut an inner wall of the hard disk rack 600 when the tool-less hard disk carrier 100 is held in a hard disk rack 600. The hard disk 500 generates vibration in operation, and at this time, the elastic sheet 170 absorbs vibration through the convex bump 172, so as to prolong the operation life of the hard disk 500. For thinning the tool-less hard disk carrier 100 to save space, the elastic sheet 170 is designed to be formed by stamping without needing to add a buffering device (e.g., a rubber pad), thereby achieving the effect of saving space.

Accordingly, in the present disclosure, the operator can put in or draw out the hard disk without any tool or screw, and can install the hard disk steadily and rapidly. The respective elements of the housing all adopt the thinning design to achieve the effect of saving space.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A tool-less hard disk carrier configured to accommodate a hard disk of which both sides have a first screw hole and a second screw hole respectively, the tool-less hard disk carrier comprising:
   a housing comprising a first sidewall and a bottom board connected to each other;
   a moving part having a sliding portion and an abutting portion connected to each other, the sliding portion being slidably engaged with the bottom board, the abutting portion being bent relative to the sliding portion to face the first sidewall, the abutting portion and the housing defining an accommodating space, and the accommodating space being configured to accommodate the hard disk;
   a first pin located in the accommodating space and connected to the first sidewall, and the first pin being configured to be inserted into the first screw hole; and
   a second pin located in the accommodating space and connected to the abutting portion, and the second pin being configured to be inserted into the second screw hole,
   wherein when the moving part moves toward the first sidewall to clamp the hard disk between the first sidewall and the abutting portion, and the first pin and the second pin are respectively inserted into the first screw hole and the second screw hole, and when the moving part moves away from the first sidewall, the second pin is drawn out of the second screw hole, and the abutting portion moves away from the hard disk.

2. The tool-less hard disk carrier of claim 1, further comprising a latching mechanism, which is pivotally connected to the bottom board and is located outside the accommodating space, and the latching mechanism selectively locks or releases the moving part.

3. The tool-less hard disk carrier of claim 2, wherein the latching mechanism comprises a first hook portion and a pivot axis pivotally connected to each other, and the pivot axis is fixed to the bottom board, and the moving part further comprises a second hook portion, and the second hook portion is connected to the sliding portion, and the first hook portion is rotated parallel to the bottom board by the pivot axis, thereby selectively locking or releasing the second hook portion.

4. The tool-less hard disk carrier of claim 3, further comprising a spring located at the bottom board, the spring being connected to the latching mechanism, the spring providing a torque to make the first hook portion continuously locked with the second hook portion.

5. The tool-less hard disk carrier of claim 1, further comprising two elastic sheets connected to the first sidewall and the abutting portion respectively, each of the elastic sheets comprising a convex bump located outside the accommodating space, the convex bump being used to abut an inner wall of the hard disk rack when the tool-less hard disk carrier is held in a hard disk rack.

6. The tool-less hard disk carrier of claim 1, further comprising a first stopping element, the first stopping element being connected to the bottom board and located outside the accommodating space, the sliding portion having a sliding groove slidably engaged with the first stopping element.

7. The tool-less hard disk carrier of claim 1, further comprising two second stopping elements, the second stopping elements being connected to the bottom board and located outside the accommodating space, the second stopping elements being located at two sides of the sliding portion respectively, each of the second stopping elements comprising:
    a side portion connected to the bottom board, wherein the sliding portion slidably abuts between the side portions; and
    a top portion connected to the side portion, the top portion being bent relative to the side portion, wherein the sliding portion slidably abuts between the bottom board and the top portions, and the side portions are perpendicular to the first sidewall so as to enable the sliding portion to perpendicularly move toward or away from the first sidewall.

8. The tool-less hard disk carrier of claim 1, further comprising a second sidewall and a third sidewall, the second sidewall being connected to the bottom board and an end of the first sidewall, the third sidewall being connected to the bottom board and another end of the first sidewall, the hard disk slidably abutting between the second sidewall and the third sidewall.

9. The tool-less hard disk carrier of claim 1, wherein the first pin comprises a first cylinder portion and a first hexagon head portion connected to each other, and the first hexagon head portion is connected to the first sidewall, and the second pin comprises a second cylinder portion and a second hexagon head portion connected to each other, and the second hexagon head portion is connected to the abutting portion.

10. The tool-less hard disk carrier of claim 3, wherein the latching mechanism further comprises an operation portion connected to the first hook portion, and the operation portion and the first hook portion extend away from the pivot axis.

* * * * *